Oct. 12, 1937.　　　C. STEENSTRUP　　　2,095,842
COMPRESSOR VALVE
Filed June 11, 1935
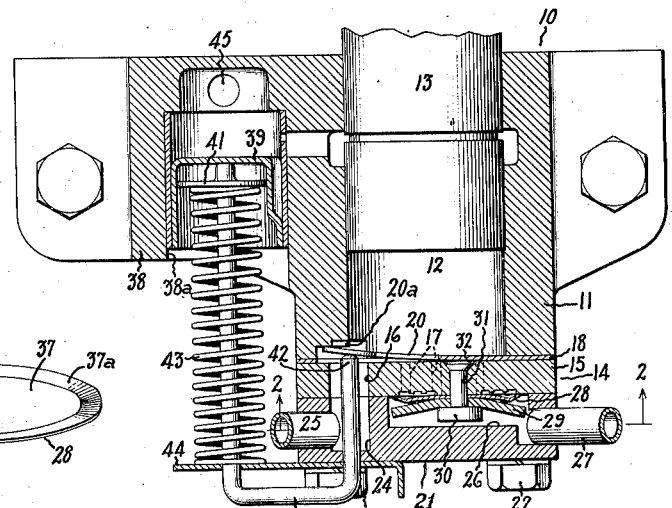
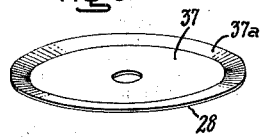
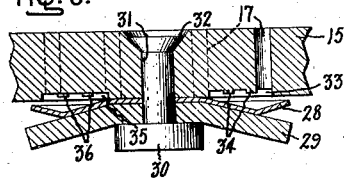
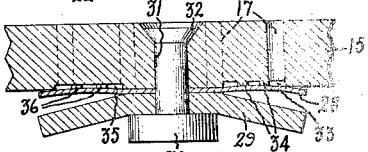
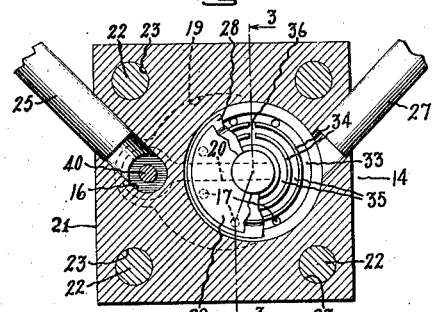
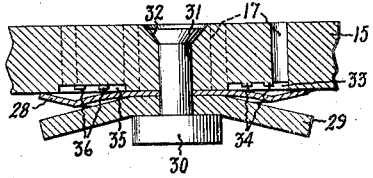
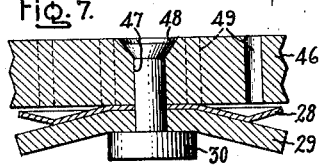
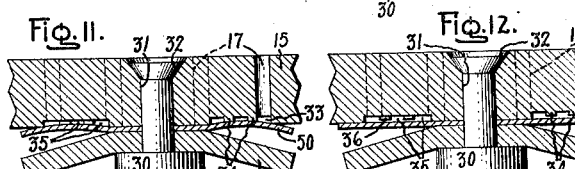
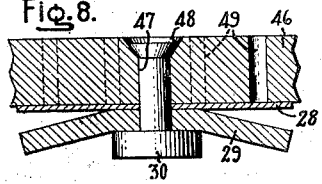
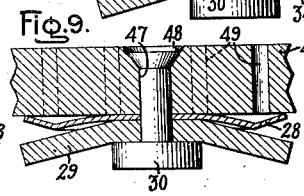
Inventor:
Christian Steentrup,
by Harry E. Dunham
His Attorney.

Patented Oct. 12, 1937

2,095,842

UNITED STATES PATENT OFFICE 2,095,842

COMPRESSOR VALVE

Christian Steenstrup, Schenectady, N. Y., assignor to General Electric Company, a corporation of New York Application June 11, 1935, Serial No. 26,068

16 Claims. (Cl. 251—119)

My invention relates to valves for compressors or the like.

It is an object of my invention to provide an automatic valve of the fluid operated type for a compressor or the like, which will form a good seal about a passage communicating with a cylinder of a compressor when closed, and which may be opened and closed with a smooth, even movement without sticking of the valve element when in its closed position, thus insuring quiet and efficient operation.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing, in which Fig. 1 is a view partly in section of a portion of a refrigerant compressor provided with a discharge valve embodying my invention; Fig. 2 is a sectional view along the line 2—2 of the valve assembly provided on the compressor shown in Fig. 1, a portion of the discharge valve and retainer therefor being broken away; Fig. 3 is an enlarged sectional view along the line 3—3 of the discharge valve included in the valve assemblies shown in Figs. 1 and 2, the valve disk being shown in the open position; Fig. 4 is similar to Fig. 3, the valve disk being shown in the closed position; Fig. 5 is similar to Fig. 3, the valve disk being shown in its position when subjected to equalized fluid pressure; Fig. 6 is a perspective view of the valve disk shown in Figs. 1 to 9, inclusive; Figs. 7, 8, and 9 are enlarged sectional views similar to Figs. 3, 4, and 5 of a modified form of valve structure embodying my invention, the valve disk being shown in its open, closed, and equalized pressure positions, respectively; and Figs. 10, 11, and 12 are enlarged sectional views of a second modified form of valve arrangement embodying my invention, the valve disk being shown in the open, closed, and equalized pressure positions, respectively.

Referring to the drawing, in Fig. 1, I have shown a refrigerant compressor 10 having a compression cylinder 11 provided with a cylindrical longitudinal bore 12. A cylindrical piston 13 is reciprocated in the cylinder bore 12 by a Scotch yoke driving mechanism or other suitable apparatus. The open lower end of the cylinder bore 12 is closed by a valve assembly 14 including a flat rectangular valve plate 15 made of steel or the like and constituting a head of the cylinder 11. The valve plate 15 is provided with a relatively large inlet passage 16 and a series of relatively small discharge passages or openings 17. A thin, flat rectangular inlet valve supporting member 18 of spring steel or the like extends across the face of the valve plate 15 adjacent the cylinder 11. It will be noted that the end of the cylinder 11, the valve supporting member 18, and the valve plate 15 all have the same peripheral dimensions. The inlet valve supporting member 18 is provided with a centrally located circular aperture 19, as shown in dotted lines in Fig. 2, which extends about the inner ends of the discharge passages 17 thus affording free communication between the cylinder and the discharge passages. A flexible integral tongue 20 is formed in the inlet valve supporting member 18 and extends diametrically across the circular aperture 19 between two of the discharge passages 17. The tongue 20 formed in the inlet valve is provided with an enlarged circular end which extends across the end of the inlet passage 16 and forms an inlet valve element therefor.

The valve assembly 14 also includes a rectangular muffle box 21 which is mounted on the exterior side of the valve plate 15 by screws 22. The screws 22 pass through registering holes 23 in the muffle box 21, the valve plate and the inlet valve supporting member 18, the inner ends of the screws being secured in tapped holes formed in the cylinder 11. The muffle box 21 is provided with an inlet cavity 24 which communicates with the inlet passage 16 and with an intake conduit 25. The muffle box 21 is also provided with a discharge cavity 26 which extends about the outer ends of the discharge passages 17 and communicates therewith. A discharge conduit 27 is provided which communicates with the discharge cavity 26 formed in the muffle box 21.

The valve assembly described above is not my invention, but is the invention of Harley H. Bixler, and is described and claimed in his application, Serial No. 26,067, filed June 11, 1935, and assigned to the General Electric Company, assignee of my present invention.

I have provided a valve element which opens and closes the discharge openings 17 in the valve plate 15 with a smooth even movement without sticking of the valve element when in its closed position, thus insuring quiet and efficient operation. This discharge valve includes a valve disk 28 made of spring steel or similar thin resilient material which extends across the outer ends of the discharge passages 17. It is desirable that the valve disk be made of relatively thin flexible material in order that it may be opened upon the application thereto of a relatively small differential in fluid pressure. Also, when the valve disk is made of thin material it may be opened a comparatively large amount thus affording unobstructed passage for fluid from the openings controlled thereby.

As best shown in Fig. 6, the valve disk 28, in its preferred form, has a configuration when unstressed in which the central or major portion of the disk is flat, the straight peripheral portion being turned inwardly a small amount so that the disk has the shape of a frustum of a cone which is of very large diameter as compared to its height. As shown in Figs. 1 to 5, inclusive, 7, 8, and 9, the valve disk is arranged with the concave face thereof adjacent the ends of the discharge passages 17. A disk-shaped valve retainer 29 is secured on the outer side of the valve disk 28 and presents a convex surface toward the valve disk. The valve retainer 29 and valve disk 28 are secured on the valve plate 15 by a rivet 30 having a central body portion which passes through registering holes formed in the centers of the valve disk and valve retainer. The rivet 30 also passes through a hole 31 formed in the valve plate 15 and the inner end thereof is peened over in a countersink 32 formed at the inner end of the hole 31 so that the inner end of the rivet 30 is located below the surface of the valve plate and does not interfere with the action of the inlet valve.

The outer ends of the discharge passages 17 communicate with an annular groove 33 formed in the surface of the valve plate 15. The surface of the valve plate 15 surrounding the groove 33 is machined flat to provide a flat valve sealing seat co-operating with the peripheral portion of the valve disk 28 to close the discharge opening 17. A series of relatively narrow concentric annular supporting seats 34 are formed on the valve plate 15 within the inner periphery of the groove 33 and concentric therewith in order to support the intermediate portion of the valve disk 28. The supporting seats 34 are separated by a series of annular grooves 35 which form open-topped gas passages exposed to the inner surface of the valve disk 28. A slot 36 is formed in the supporting seats 34 for equalizing the fluid pressure in the discharge passages 17 and the open-topped gas passages 35 so that the intermediate portion of the disk 28 is always exposed to the pressure of the gas in the discharge passages 17. The annular supporting seats 34 support the intermediate portion of the valve disk 28 so that it may be made of thin material while the provision of the gas passages 35 between the seats 34 and the fact that the seats 34 are narrow prevents sticking of the valve disk 28 on the seats 34.

The refrigerant compressor illustrated in Fig. 1 is particularly adapted for use in compressing gaseous sulphur dioxide and is designed for a piston displacement of approximately one cubic inch per stroke. With such a compressor I have found it desirable to provide a discharge valve which opens upon a pressure of approximately 1½ pounds per square inch, and in such case the valve disk 28 may be made of spring steel which is .007 inch thick and 1⅜ inches in diameter. If a valve element of the dimensions indicated is used, the flat central body portion 37 thereof may be offset from the inclined straight edge 37a thereof approximately .002 inch. The concavity of the valve disk 28 has been exaggerated in the drawing in order that the action of the valve may be more clearly illustrated. The surfaces of the supporting seats 34 are preferably located approximately .002 inch below the surface of the valve plate 15 if a valve disk of the dimensions given above is utilized.

The valve retainer 29 and rivet 30 hold the central portion of the valve disk 28 under flexure and the center thereof in contact with the surface of the valve plate 15. As a consequence, when the valve disk is subjected to equal fluid pressures on opposite sides thereof it assumes a position such as is shown in Fig. 5 with the edge of the disk in contact with the valve plate and an intermediate portion of the valve disk having a configuration out of alinement with the peripheral portion thereof. When the fluid pressure on the exterior side of the valve disk 28 is increased, the valve disk is forced tightly against the supporting seats 34 and the peripheral portion of the valve disk 28 is forced against the valve sealing surface formed on the surface of the valve plate 15, thus sealing the outer ends of the discharge passages 17. The principal sealing takes place at the edge of the groove 33 as best shown in Fig. 4. The intermediate portion of the valve disk 28 is supported on the seats 34, when the valve disk is in this closed position. When the pressure on the inner side of the valve disk 28 is increased a predetermined amount, it moves into the open position shown in Fig. 3, being forced back against the retainer 29. In moving from the closed to the open position the natural tendency of the intermediate portion of the valve disk 28 is to assume the configuration shown in Fig. 5 in which an intermediate portion thereof is out of alignment with the peripheral portion thereof. In moving from the closed position shown in Fig. 4 to the opened position shown in Fig. 3, the valve disk 28 first moves away from the valve plate 15 at the annular supporting seats 34 due to the pressure of the gas which enters the grooves 35 from the passages 17 through the equalizing slot or passage 36. Since the supporting seats 34 are located slightly below the level of the sealing seat formed on the valve plate 15 around the periphery of the groove 33, the resiliency of the valve disk 28 insures that the valve disk will first be unseated in the intermediate portion thereof, that is, the portion which contacts the seats 34. The resilient tendency of the valve disk 28 to assume the configuration shown in Fig. 5 then causes it to progressively move away from the sealing seat formed on the valve plate 15 about the groove 33 from the inner part of the valve disk toward the edge thereof. The valve disk 28 is thus in effect "peeled" from the valve plate 15 thus avoiding sticking of the valve disk. When the valve disk has reached the position of equalized pressure shown in Fig. 5, a further increase in fluid pressure on the inner side thereof causes it to be forced back against the adjacent face of the valve retainer 29 and assume the full opened position shown in Fig. 3. Since the valve disk is peeled from the valve plate rather than being separated therefrom throughout a comparatively wide area at substantially the same instant, the valve disk is opened without sticking or sudden movement which I have found to be a great source of noise in discharge valves of the conventional type.

It will be noted that when the valve disk 28 again moves from the open position, as shown in Fig. 3, to the closed position, as shown in Fig. 4, that the edge of the valve disk 28 will first come in contact with the flat portion of the valve plate 15 surrounding the groove 33 before the remainder of the valve disk 28 comes in contact with the valve plate 15. This preliminary edgewise contact between the valve disk 28 and the valve plate 15 is advantageous in that if any particles of dirt or other foreign matter have been deposited on the surface of the valve plate 15 they will either be cut or forced out of the way by the sharp edge of the valve disk 28 as it comes in contact with the valve plate 15, so that these particles of dirt will not remain on the surface of the valve plate 15 between it and the valve disk 28 thus preventing proper seating of the portion of the valve disk.

It will be noted that the discharge passages 17 are distributed over only about two-thirds of the periphery of the valve disk 28. This unsymmetrical distribution is advantageous in that compressed fluid escaping past the edges of the valve disk 28 has less tendency to make the valve disk vibrate in resonance when unevenly distributed. A whining noise which the valve element might otherwise make is thus avoided since its vibrations, if any, are aperiodic.

The compressor 10 shown in Fig. 1 is provided with an unloader cylinder 38 which is formed as an integral part of the casting of the compressor cylinder 11. The unloader cylinder 38 has a longitudinal cylindrical bore 38a formed therein parallel to the compression cylinder bore 12 in which is arranged an unloader piston 39. A U-shaped operating rod 40 is secured at one end to a disk 41 which is rigidly mounted in the unloader piston 39 and the opposite end 42 of the operating rod 40 bears against the enlarged end of the tongue 20, thus opening the inlet passage 16. The operating rod 40 and unloader piston 39 are biased to the position illustrated in Fig. 1 by a helical compression spring 43 mounted between the disk 41 and a retaining plate 44 which is secured to the exterior side of the muffle box 21 by two of the screws 22.

The compressor unloader described above is not my invention but is the invention of Harley H. Bixler, and is described and claimed in his application, Serial No. 1,337, filed January 11, 1935, and assigned to the General Electric Company, the assignee of my present invention.

In the operation of the compressor and valve structure described above fluid, such as lubricating oil, is supplied under pressure to the bore 38a of the unloader cylinder 38 through an inlet 45. The fluid accumulated in the unloader bore 38a causes the piston 39 to move outwardly against the bias of the compression spring 43, and the U-shaped operating rod 40 is thus moved outwardly so that its end 42 disengages the tongue 20 allowing the same to operate freely. When the compressor piston 13 is retracted in the compressor cylinder bore 12, the pressure therein is reduced and the pressure of the gaseous refrigerant in the inlet passage 16 causes the tongue 20 to be flexed backward away from the inner end of the inlet passage 16, thus allowing the compressor cylinder bore 12 to be filled with gaseous refrigerant from the intake conduit 25. At the same time the discharge valve disk 28 is substantially flattened against the outer side of the valve plate 15 by the pressure of the gas in the discharge cavity 26 formed in the muffle box 21. The discharge valve disk 28 is thus moved to its closed position shown in Fig. 4. When the reciprocating cylinder 13 again moves downwardly on the compression stroke, the gaseous refrigerant contained in the compression cylinder bore 12 is compressed and the tongue 20 is flexed back to its flat position by the pressure of the compressed gaseous refrigerant where it again closes the inlet passage 16. A stop 20a formed on the cylinder 12 against which the tongue 20 rests when in its open position allows the gaseous refrigerant in the cylinder bore 12 to act on a relatively large portion of the rear face of the tongue 20. When the pressure of the gaseous refrigerant compressed in the compression cylinder bore 12 reaches a predetermined value with respect to the gaseous refrigerant contained in the discharge recess 26, the inherent resiliency of the valve element 28 causes it to be flexed to the position shown in Fig. 5 and then a further increase in pressure of the gaseous refrigerant flowing through the discharge openings 17 causes the valve disk to be moved to its full opened position, shown in Fig. 3. The compressed gaseous refrigerant discharged through the openings 17 enters the discharge recess 26 formed in the muffle box 21 and passes therefrom through the discharge conduit 27.

In Figs. 7, 8, and 9, I have shown a modified form of discharge valve embodying my invention which may be used in a compressor of the type shown in Fig. 1. The discharge valve shown in Figs. 7, 8, and 9 is the same as that described above except that it includes a valve plate 46 which corresponds to the valve plate 15 in Figs. 1 to 5 and is provided with a flat machined surface adjacent the thin flexible valve disk rather than being grooved as is the valve plate 15. The same reference characters have been used to designate identical parts. The valve disk 28, as shown in Fig. 6, has a frustro-conical form when unstressed. The disk-shaped valve retainer 29 is positioned on the outer side of the valve disk 28 and presents a convex surface toward the valve disk. The valve disk 28 and valve retainer 29 are held in position on the valve plate 46 by a rivet 30 having a central body portion which passes through registering holes formed in the centers of the valve disk and valve retainer and a hole 47 formed in the valve plate 46. The inner end of the rivet 30 is peened over in a countersink 48 formed at the inner end of the hole 47. The valve disk 28 co-operates with a valve sealing seat formed by the flat surface of the valve plate 46 to close a series of discharge openings 49 formed in the valve plate 46. The discharge openings 49 are unsymmetrically distributed about the periphery of the valve disk 28, in the same manner as the openings 17 in Fig. 2.

When the valve disk 28 is subjected to equalized fluid pressures, it tends to assume the configuration shown in Fig. 9 in which an intermediate portion thereof is out of alignment with the peripheral portion thereof. When the fluid pressure on the exterior side of the valve disk 28 is increased, it is substantially flattened against the adjacent surface of the valve plate 46, as shown in Fig. 8, thus closing the discharge openings 49. An increase in fluid pressure in the discharge openings 49 causes the valve disk 28 to be peeled from the valve plate 46 until it assumes the position shown in Fig. 9 and a further increase in fluid pressure acting on the inner side thereof causes it to be forced back against the valve retainer 29 to the position shown in Fig. 7 in which the discharge valve is fully opened.

In Figs. 10, 11, and 12, I have shown a further modification of a discharge valve embodying my invention which may be used in a compressor such as is shown in Fig. 1. The discharge valve shown in Figs. 10, 11, and 12 is the same as that shown in Figs. 1 to 5 inclusive, and described above, except that it includes a valve disk 50 which corresponds to the valve disk 28 described above, but in this case the valve disk 50 is a flat disk made of thin spring steel or the like rather than being frustro-conical in shape as is the valve disk 28. The same reference characters have been used to designate identical parts. A disk-shaped valve retainer 29 is positioned on the outer side of the valve disk 50 and presents a convex surface toward the valve disk. The valve disk 50 and valve retainer 29 are held in position on the valve plate 15 by a rivet 30 having a central body portion which passes through registering holes formed in the centers of the valve disk and valve retainer and a hole 31 formed in the valve plate 15. The inner end of the rivet 30 is peened over in a countersink 32 formed at the inner end of the hole 31. The valve plate 15 shown in Figs. 10, 11, and 12 is identical with the valve plate 15 shown in Figs. 1 to 5 inclusive, being provided with a series of discharge passages 17 opening into an annular groove 33 formed in the face of the valve plate adjacent the valve disk 50. A series of relatively narrow annular supporting seats 34 are formed on the face of the valve plate 15, the seats 34 being separated by a series of annular grooves concentric with the grooves 33. Communication is afforded between the grooves 35 and the groove 33 by a slot 36. The portion of the valve plate 15 surrounding the groove 33 is machined flat in order to provide a valve sealing seat for the peripheral portion of the valve disk 50. The tops of the annular supporting seats 34 are located slightly below the level of the valve sealing seat. The valve disk 50 co-operates with the valve sealing seat formed on the face of the valve plate 15 to close the discharge passages 17 formed in the valve plate.

When the valve disk 50 is subjected to equalized fluid pressures, it assumes the flat configuration shown in Fig. 12. When the fluid pressure on the exterior side of the valve disk 50 is increased, the intermediate portion thereof is forced inwardly against the annular supporting seats 34, and the peripheral portion co-operates with the edge of the valve sealing seat formed on the valve plate 15 to form a tight seal about the exterior edge of the groove 33 into which the discharge passages 17 open, as shown in Fig. 11. The ends of the discharge passages 17 are thus sealed. When the pressure of the gas in the discharge passages 17 increases, the increased pressure is communicated to the gas in the grooves 35 through the pressure equalizing slot 36 thus causing the intermediate portion of the valve disk 50 to be lifted from the annular supporting seats 34. The disk is thus moved to its equalized pressure position with the peripheral portion thereof lying flat on the valve plate 15, as shown in Fig. 12. A further increase in the pressure of the gas acting on the inner side of the valve disk 50 causes the same to be moved outwardly against the valve retainer 29 to the full open position shown in Fig. 10. In such opening movement, the peripheral portion of the valve disk is progressively peeled from the valve plate from the portion over the groove 33 to the outer edge thereof. This progressive opening movement of the valve disk 50 precludes the possibility of sticking thereof, and thus ensures quiet operation. Since the intermediate portion of the valve disk 50 is supported on the annular seats 34 it is possible to make the valve disk 50 of comparatively thin flexible material, thus ensuring efficient operation of the valve.

While I have shown a particular embodiment of my invention in connection with a refrigerant compressor, I do not desire my invention to be limited to the particular construction shown and described, and I intend in the appended claims to cover all modifications within the spirit and scope of my invention.

What I claim as new and desire to secure by Letters Patent of the United States is:

1. A valve for compressors comprising a valve plate or the like, a thin resilient valve disk positioned on said valve plate, means for preventing relative movement between the central portion of said disk and said valve plate, the peripheral portion of said resilient disk being adapted to flex upwardly away from said valve plate, said valve plate having a series of openings formed therein and distributed unsymmetrically about the center of said valve disk, and an annular valve sealing seat surrounding said openings and co-operating with said valve disk to close said openings.

2. A valve for compressors comprising a valve plate or the like, a thin resilient valve disk positioned on said valve plate, means for preventing relative movement between the central portion of said disk and said valve plate, the peripheral portion of said resilient disk being adapted to flex upwardly away from said valve plate, said valve plate having a series of openings formed therein, said series of openings being distributed about a major portion only of the circumference of said valve disk, and an annular valve sealing seat surrounding said openings and co-operating with said valve disk to close said openings.

3. A valve for compressors comprising a valve plate or the like having an annular groove therein and a series of openings therein communicating with said groove, a valve sealing seat surrounding said groove, a thin resilient valve disk co-operating with said valve sealing seat to close said openings, means for rigidly securing the center of said valve disk to said valve plate, and means including a plurality of relatively narrow annular supporting seats formed on said valve plate within said groove and concentric therewith for supporting the portion of said valve disk between the center thereof and said groove, said valve plate being provided with grooves separating said supporting seats and with a pressure equalizing passage communicating with said first mentioned groove and with said grooves between said supporting seats.

4. A valve for compressors comprising a valve plate or the like having a series of openings therein arranged on the circumference of a circle, a flat annular valve sealing seat surrounding said openings, a thin resilient valve disk co-operating with said valve sealing seat to close said openings, means for rigidly securing the center of said valve disk to a portion of said valve plate substantially in alinement with said valve sealing seat, and means including a plurality of relatively narrow annular supporting seats concentric with said valve disk and separated by annular open-top gas passages for supporting the portion of said valve disk between the center thereof and said openings, said supporting seats being located below the surface of said flat valve sealing seat and said gas passages communicating with at least one of said openings and exposed to the adjacent surface of said valve disk.

5. A valve for compressors comprising a valve plate or the like having an annular groove therein and a series of openings therein communicating with said groove, said series of openings being distributed over only approximately two-thirds of the circumference of said groove, a valve sealing seat surrounding said groove, a thin resilient valve disk co-operating with said valve sealing seat to close said openings, means for rigidly securing the center of said valve disk to said valve plate, and means including a plurality of relatively narrow annular supporting seats formed on said valve plate within said groove and concentric therewith for supporting the portion of said valve disk between the center thereof and said groove, said valve plate being provided with concentric grooves separating said supporting seats and also provided with a pressure equalizing passage communicating with said first mentioned groove and with said grooves between said supporting seats.

6. A valve for compressors comprising a valve plate or the like having an annular groove therein and a series of openings therein communicating with said groove, a flat annular valve sealing seat surrounding said groove, a thin flat resilient valve disk co-operating with said flat valve sealing seat to close said openings, a valve retainer mounted on the top of said valve disk and having a convex surface presented toward said valve disk, means passing through the centers of said valve retainer and said valve disk for rigidly securing them to a portion of said valve plate substantially in alinement with said valve sealing seat, and means including a plurality of relatively narrow annular supporting seats concentric with said valve disk for supporting the portion of said valve disk between the center thereof and said groove, said supporting seats being located below the surface of said flat valve sealing seat and separated by annular open-top gas passages, said gas passages communicating with at least one of said openings and exposed to the adjacent surface of said valve disk.

7. A valve for compressors comprising a valve plate or the like having an annular groove therein and a series of openings therein communicating with said groove, said series of openings being distributed over a portion only of the circumference of said groove, a flat annular valve sealing seat surrounding said groove, a thin flat resilient valve disk co-operating with said flat valve sealing seat to close said openings, a valve retainer mounted on the top of said valve disk and having a convex surface presented toward said valve disk, means passing through the centers of said valve retainer and said valve disk for rigidly securing them to said valve plate, and means including a plurality of relatively narrow annular supporting seats concentric with said valve disk for supporting the portion of said valve disk between the center thereof and said groove, said supporting seats being located below the surface of said flat valve sealing seat and said valve plate having annular open-top gas passages therein interposed between said valve supporting seats and communicating with at least one of said openings and exposed to the adjacent surface of said valve disk.

8. A valve for compressors comprising a valve plate or the like having a series of openings therein, an annular valve sealing seat surrounding said openings, a resilient valve disk, means for retaining the central body portion of said valve disk in a flexed position adjacent said valve plate, the peripheral portion of said valve disk contacting with said seat and an intermediate portion of said valve disk between said peripheral portion and said central body portion having a configuration out of alinement with respect to said peripheral portion of said valve disk when said valve disk is subjected to equal fluid pressures on the opposite surfaces thereof, the resilience of said intermediate portion of said valve disk causing the same to assume said configuration out of alinement with respect to said peripheral portion of said valve disk to provide a smooth opening movement of said valve disk under the influence of fluid pressure thereon, and means including a plurality of relatively narrow annular supporting seats concentric with said valve disk for supporting said intermediate portion of said valve disk, said supporting seats being located below the surface of said valve sealing seat and separated by annular open-topped gas passages, said gas passages communicating with at least one of said openings and being exposed to the adjacent surface of said valve disk.

9. A valve for compressors comprising a valve plate or the like having an annular groove therein and a series of openings therein communicating with said groove, said series of openings being unsymmetrically distributed about said groove, a flat annular valve sealing seat surrounding said groove, a resilient valve disk, means for retaining the central body portion of said valve disk in a flexed position adjacent said valve plate, the peripheral portion of said valve disk contacting with said sealing seat and an intermediate portion of said valve disk between said peripheral portion and said central body portion having a configuration out of alinement with respect to said peripheral portion of said valve disk when said valve disk is subjected to equal fluid pressures on the opposite surfaces thereof, the resilience of said intermediate portion of said valve disk causing the same to assume said configuration out of alinement with respect to said peripheral portion of said valve disk to provide a smooth opening movement of said valve disk under the influence of fluid pressure thereon, and means including a plurality of relatively narrow annular supporting seats formed on said valve plate within said groove and concentric therewith for supporting said intermediate portion of said valve disk, said valve plate being provided with a series of concentric grooves separating said supporting seats and also provided with a pressure equalizing passage communicating with said first-mentioned groove and with said grooves between said supporting seats.

10. A valve for compressors comprising a valve plate or the like having an annular groove therein and a series of openings therein communicating with said groove, said series of openings being unsymmetrically distributed about said groove, a flat annular valve sealing seat surrounding said groove, a resilient valve disk, means including a valve retainer mounted on the top of said valve disk and having a convex surface presented toward said valve disk for retaining the central body portion of said valve disk in a flexed position adjacent said valve plate, the peripheral portion of said valve disk contacting with said sealing seat and an intermediate portion of said valve disk between said peripheral portion and said central body portion having a configuration out of alinement with respect to said peripheral portion of said valve disk when said valve disk is subjected to equal fluid pressures on the opposite surfaces thereof, the resilience of said intermediate portion of said valve disk causing the same to assume said configuration out of alinement with respect to said peripheral portion of said valve disk to provide a smooth opening movement of said valve disk under the influence of fluid pressure thereon, and means including a plurality of relatively narrow annular supporting seats formed on said valve plate within said groove and concentric therewith for supporting said intermediate portion of said valve disk, said supporting seats being located below the surface of said flat valve sealing seat, said valve plate being provided with a series of concentric grooves separating said supporting seats and also provided with a pressure equalizing passage communicating with said first mentioned groove and with said grooves between said supporting seats.

11. A valve for compressors comprising a valve plate or the like having an opening therein, a valve sealing seat surrounding said opening, a thin resilient valve element cooperating with said valve sealing seat to close said opening, means laterally displaced from said opening for retaining said valve element in operative relation with said sealing seat, and means including a plurality of relatively narrow supporting seats for supporting the portion of said valve element between said opening and said positioning means, said supporting seats being separated by at least one open-top gas passage exposed to said valve element and communicating with said opening below and next to the adjacent surface of said valve element when in its closed position.

12. A valve for compressors comprising a valve plate or the like having an opening therein, an annular valve sealing seat surrounding said opening, a thin resilient valve disk cooperating with said valve sealing seat to close said opening, means located at the center of said valve disk for retaining the same in operative relation with said sealing seat, and means including a plurality of relatively narrow supporting seats for supporting the portion of said valve disk between said opening and the center thereof, said supporting seats being separated by at least one open top gas passage exposed to said valve disk and communicating with said opening below and next to the adjacent surface of said valve disk when in its closed position.

13. A valve for compressors comprising a valve plate or the like having a series of openings therein arranged on the circumference of a circle, an annular valve sealing seat surrounding said openings, a thin resilient valve disk cooperating with said valve sealing seat to close said openings, means for rigidly securing the center of said valve disk to said valve plate, and means including a plurality of relatively narrow annular supporting seats concentric with said valve disk and separated by annular open-top gas passages for supporting the portion of said disk between the center thereof and said openings, said gas passages communicating with at least one of said openings below and next to the adjacent surface of said valve disk when in its closed position and exposed to the adjacent surface of said valve disk.

14. A valve for compressors comprising a valve plate or the like having a series of openings therein, an annular valve sealing seat surrounding said openings, a resilient valve disk, means for retaining the central body portion of said valve disk in a flexed position adjacent said valve plate, the peripheral portion of said valve disk contacting with said seat and an intermediate portion of said valve disk between said peripheral portion and said central body portion having a configuration out of alinement with respect to said peripheral portion of said valve disk when said valve disk is subjected to equal fluid pressures on the opposite surfaces thereof, the resilience of said intermediate portion of said valve disk causing the same to assume said configuration out of alinement with respect to said peripheral portion of said valve disk to provide a smooth opening movement of said valve disk under the influence of fluid pressure thereon, and means including a plurality of relatively narrow annular supporting seats concentric with said valve disk for supporting said intermediate portion of said valve disk, said supporting seats being separated by annular open-topped gas passages, said gas passages communicating with at least one of said openings below and next to the adjacent surface of said valve disk when in its closed position and being exposed to the adjacent surface of said valve disk.

15. A valve for compressors comprising a valve plate or the like having an opening therein, a valve sealing seat surrounding the opening, a thin resilient valve disk co-operating with said valve sealing seat to close said opening, means for securing the center of said valve disk to said valve plate, and means including said valve sealing seat for retaining by fluid pressure acting on said valve disk a portion of said valve disk between said securing means and said seat in a concave configuration with the seating side thereof below said sealing seat upon closing of said valve, said portion of said valve disk being retained in an opposite concave configuration upon opening of said valve by fluid pressure acting thereon.

16. A valve for compressors comprising a valve plate or the like having an opening therein, a valve sealing seat surrounding said opening, a thin resilient valve disk co-operating with said valve sealing seat to close said opening, and means for securing the center of said valve disk to said valve plate, the periphery of said valve disk terminating in a frusto-conical portion with the greatest diameter adjacent said seat when said valve disk is subjected to equal pressure on the opposite sides thereof, the frusto-conical periphery of said valve disk having an edge engaging said valve sealing seat and being flattened during ordinary cyclic operation of said valve and when said valve is closed by fluid pressure acting on said valve disk.

CHRISTIAN STEENSTRUP.